(12) United States Patent
Forssell et al.

(10) Patent No.: US 9,603,055 B2
(45) Date of Patent: Mar. 21, 2017

(54) CONTROLLING LTE/WI-FI AGGREGATION

(71) Applicant: Nokia Solutions and Networks Oy, Espoo (FI)

(72) Inventors: Mika Forssell, Porvoo (FI); Jari O. Lehtonen, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 154 days.

(21) Appl. No.: 14/610,079

(22) Filed: Jan. 30, 2015

(65) Prior Publication Data

US 2016/0227440 A1 Aug. 4, 2016

(51) Int. Cl.
*H04W 28/10* (2009.01)
*H04L 12/851* (2013.01)
*H04W 36/00* (2009.01)
*H04L 5/00* (2006.01)
*H04W 28/08* (2009.01)

(52) U.S. Cl.
CPC ............. *H04W 28/10* (2013.01); *H04L 5/001* (2013.01); *H04L 5/0098* (2013.01); *H04L 47/2441* (2013.01); *H04W 28/08* (2013.01); *H04W 36/0011* (2013.01)

(58) Field of Classification Search
None
See application file for complete search history.

(56) References Cited

U.S. PATENT DOCUMENTS

2013/0242897 A1 9/2013 Meylan et al.
2014/0078906 A1* 3/2014 Chen ...................... H04L 69/18
370/237

(Continued)

FOREIGN PATENT DOCUMENTS

WO WO 2013/009635 A2 1/2013

OTHER PUBLICATIONS

RFC 2474; K. Nichols, et al.; "Definition of the Differentiated Services Field (DS Field) in the IPv4 and IPv6 Headers", Network Working Group; Dec. 1998, (18 pages).

(Continued)

*Primary Examiner* — Diane Lo
(74) *Attorney, Agent, or Firm* — Harrington & Smith

(57) ABSTRACT

In accordance with the exemplary embodiments there is at least a method and apparatus to determine a level of benefit to at least one of a user equipment and a network to aggregate data traffic to or from the user equipment over more than one carrier; and based on the determining, indicate a traffic classification of the data traffic to or from the user equipment, wherein the traffic classification identifies the level of the benefit to aggregate the data traffic to or from the user equipment over the more than one carrier. Further, in accordance with the exemplary embodiments there is at least a method and apparatus to identify a traffic classification of data traffic to or from a user equipment; and based on the identified traffic classification, one of activate and deactivate an aggregation over more than one carrier of the data traffic to or from the user equipment, wherein the traffic classification identifies a level of benefit to at least one of the user equipment and a network to aggregate the data traffic to or from the user equipment over more than one carrier.

24 Claims, 5 Drawing Sheets

| TC field values | Note |
|---|---|
| 0 | Traffic doesn't benefit from aggregation function. |
| 1 | Traffic benefits from aggregation function. |

Example Traffic Classification values indicating to RAN if traffic benefits from aggregation function.

(56) References Cited

U.S. PATENT DOCUMENTS

| | | | | |
|---|---|---|---|---|
| 2014/0241183 A1* | 8/2014 | Comeau | ............... | H04L 5/0098 |
| | | | | 370/252 |
| 2014/0369198 A1 | 12/2014 | Rinne et al. | | |
| 2014/0369329 A1* | 12/2014 | Lee | ...................... | H04W 28/06 |
| | | | | 370/338 |
| 2015/0334724 A1* | 11/2015 | Faccin | ................. | H04W 48/16 |
| | | | | 370/235 |
| 2015/0350290 A1* | 12/2015 | Yang | ...................... | H04L 65/80 |
| | | | | 348/14.02 |

OTHER PUBLICATIONS

IEEE Std 802.11af-2013; IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 5: Television White Spaces (TVWS) Operation, (198 pages).

Mahmoud H. Qutqut, et al.; "HOF: A History-based Offloading Framework for LTE Networks using Mobile Small cells and Wi-Fi"; 9th IEEE International Workshop on Performance and Management of Wireless and Mobile Networks, 2013; pp. 77-83.

Yangchum Li, et al.; "Adaptive Traffic Offloading Method Based on OWN in Overlay Networks with LTE and WLAN"; Information Technology Journal 2014; pp. 1-7.

* cited by examiner

| Octet/Bit | 8 | 7 | 6 | 5 | 4 | 3 | 2 | 1 |
|---|---|---|---|---|---|---|---|---|
| 1 | 0x01 | | | | | | | |
| 2 | TC | Spare | spare | spare | Spare | spare | Spare | Spare |
| 3 | spare | Spare | spare | spare | Spare | spare | Spare | Spare |
| 4 | Next Extension Header Type | | | | | | | |

GTP-U extension header for detailed traffic type information (Traffic Type).

FIGURE 3A

| TC field values | Note |
|---|---|
| 0 | Traffic doesn't benefit from aggregation function. |
| 1 | Traffic benefits from aggregation function. |

Example Traffic Classification values indicating to RAN if traffic benefits from aggregation function.

FIGURE 3B

510: determining, by a device, a level of benefit to at least one of a user equipment and a network to aggregate data traffic to or from the user equipment over more than one carrier 520: based on the determining, indicating a traffic classification of the data traffic to or from the user equipment, wherein the traffic classification identifies the level of the benefit to aggregate the data traffic to or from the user equipment over the more than one carrier

FIGURE 5A

550: identifying, by a network device, a traffic classification of data traffic to or from a user equipment 560: based on the identified traffic classification, one of activating and deactivating an aggregation over more than one carrier of the data traffic to or from the user equipment, wherein the traffic classification identifies a level of benefit to at least one of the user equipment and a network to aggregate the data traffic to or from the user equipment over more than one carrier

FIGURE 5B

CONTROLLING LTE/WI-FI AGGREGATION

TECHNICAL FIELD

The teachings in accordance with the exemplary embodiments of this invention relate generally to controlling activation/deactivation of carrier aggregation and, more specifically, relate controlling activation/deactivation of LTE/Wi-Fi carrier aggregation.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
AP access point
DPI deep packet inspection
DSCP DiffSery codepoint
eNB base station
EPC evolved packet core
FDD frequency division duplex
GPRS general packet radio service
GTP GPRS tunneling protocol
HTTP hypertext transport protocol
HTTPS hypertext transport protocol secure
IP internet protocol
ISM industrial, scientific, medical
LTE long term evolution
MAC media access control
PCC policy control and charging
PDCP packet data convergence protocol
PHY physical layer
QCI QoS class of identifier
QoE quality of experience
QoS quality of service
RAN radio access network
RAT radio access technology
RLC radio link control
RRM radio resource manager
SW software
TCP transmission control protocol
TDD time division duplex
ToS type of service
UDP user datagram protocol
UE user equipment
WLAN wireless local area network LTE Advanced offers higher data rates than prior releases. However, even though spectrum usage efficiency has improved, sometimes this alone cannot provide data rates that may be required by some devices.

One method to achieve even higher data rates is to increase transmission bandwidths over those that can be supported by a single carrier or channel is carrier aggregation (CA), or aggregation. Using carrier aggregation it is possible to utilize more than one carrier and in this way increase the overall transmission bandwidth.

A major goal of carrier aggregation is to provide enhanced and consistent user experience across the cell such as by maximizing a peak data rate and throughput, improving mobility and mitigating relative inefficiencies, and providing load-balancing and thus more consistent QoS of data transmission thanks to the load-balancing.

The exemplary embodiments of the invention as discussed herein work to better control carrier aggregation for devices such as mobile equipment.

SUMMARY

In an exemplary aspect of the invention, there is an apparatus comprising: at least one processor; and at least one memory including computer program code, where the at least one memory and the computer program code are configured, with the at least one processor, to cause the apparatus to at least: determine a level of benefit to at least one of a user equipment and a network to aggregate data traffic to or from the user equipment over more than one carrier; and based on the determining, indicate a traffic classification of the data traffic to or from the user equipment, wherein the traffic classification identifies the level of the benefit to aggregate the data traffic to or from the user equipment over the more than one carrier.

In an exemplary aspect of the invention, there is a method comprising: determining, by a device, a level of benefit to at least one of a user equipment and a network to aggregate data traffic to or from the user equipment over more than one carrier; and based on the determining, indicating a traffic classification of the data traffic to or from the user equipment, wherein the traffic classification identifies the level of the benefit to aggregate the data traffic to or from the user equipment over the more than one carrier.

In another exemplary aspect of the invention, there is apparatus comprising: at least one processor; and at least one memory including computer program code, where the at least one memory and the computer program code are configured, with the at least one processor, to cause the apparatus to at least: identify a traffic classification of data traffic to or from a user equipment; and based on the identified traffic classification, one of activate and deactivate an aggregation over more than one carrier of the data traffic to or from the user equipment, wherein the traffic classification identifies a level of benefit to at least one of the user equipment and a network to aggregate the data traffic to or from the user equipment over more than one carrier.

In still another exemplary aspect of the invention, there is method comprising: identifying, by a network device, a traffic classification of data traffic to or from a user equipment; and based on the identified traffic classification, one of activating and deactivating an aggregation over more than one carrier of the data traffic to or from the user equipment, wherein the traffic classification identifies a level of benefit to at least one of the user equipment and a network to aggregate the data traffic to or from the user equipment over more than one carrier.

BRIEF DESCRIPTION OF THE DRAWINGS

The foregoing and other aspects of embodiments of this invention are made more evident in the following Detailed Description, when read in conjunction with the attached Drawing Figures, wherein:

FIGS. 3A and 3B show a new GTP-U extension header and bit settings, respectively, in accordance with an exemplary embodiment of the invention;

FIGS. 5A and 5B each show a method in accordance with the exemplary embodiments which may be performed by an apparatus.

DETAILED DESCRIPTION

In this invention, there is provided at least a method and apparatus to control and implement activation/deactivation of LTE/Wi-Fi carrier aggregation.

Figure 1:
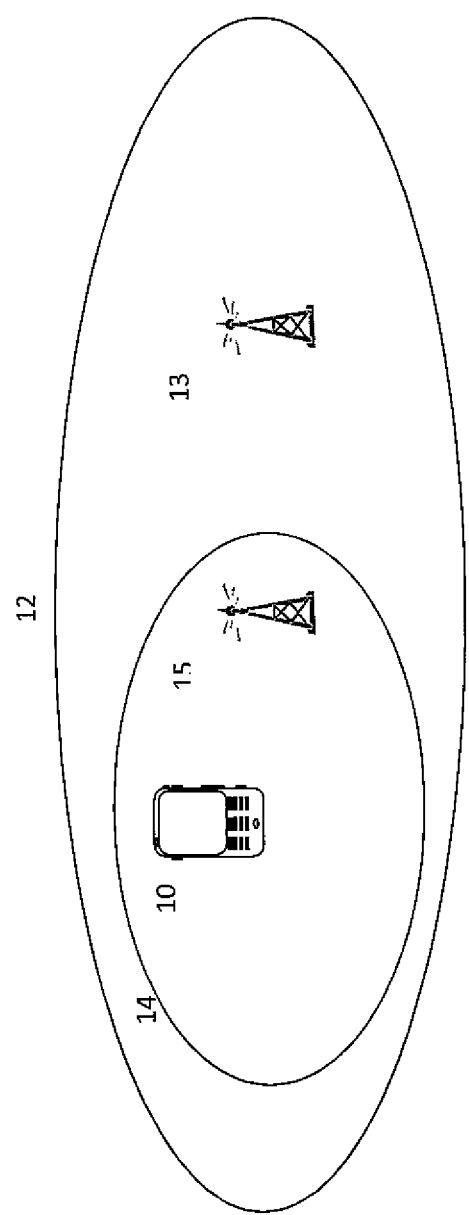
FIG. 1 is a diagram illustrating an example of a User Equipment (UE) in partially overlapping cells.

Referring also to FIG. 1, a UE 10 may be connected to more than one cell at a same time. In this example the UE 10 is connected to a PCell 12 through a base station 13 (such as an eNB for example) and a SCell 14 through a base station 15 (such as an eNB or WiFi Access Point for example). The two cells 12, 14 are, thus, at least partially overlapping. The PCell 12 may operate on a licensed band or unlicensed band and similarly the SCell 14 may operate on a licensed or unlicensed band, such as ISM bands. In certain scenarios, the Scell may operate also on licensed band(s). The PCell may be either a FDD cell or TDD cell for example. For simplicity, there are just one P Cell and one SCell depicted in the scenario shown in FIG. 1. In other alternate examples any number of cells (PCell and SCell) operating on licensed and/or unlicensed band(s) may be provided to work together for a suitable Carrier Aggregation (CA). For example when UE uses licensed LTE, unlicensed LTE and Wi-Fi connections may be activated to perform aggregation over the three radio technologies to reach highest bit rates when seen feasible and UE and network support this. A Wi-Fi link in accordance with the exemplary embodiments can be utilized in an unlicensed band, unless also licensed variant is specified. In one type of example embodiment the PCell and SCell may be co-located.

It is noted that 3GPP rel-13 and beyond can include LTE/Wi-Fi aggregation technology where an eNB manages UE mobility but can utilize Wi-Fi as a second carrier for data transmission (Wi-Fi as data pump), for example to increase peak bit rate. The new use cases enabled include e.g. carrier aggregation, complete network control of available resources and dynamic radio resource usage based on load and radio quality. LTE PDCP or even RLC is expected to be used on top of Wi-Fi stack multiplexing PDCP/RLC blocks over LTE and Wi-Fi radios and de-multiplexing received packets to form once again complete IP packets despite if both LTE and Wi-Fi are used. Another main alternative is to use Serving GW to distribute selected traffic over LTE access and other traffic over Wi-Fi access. This invention applies to all these scenarious.

Further, it is noted that LTE/Wi-Fi aggregation may not benefit all data traffic to or from a UE or other device. For example 64 kbit/s Internet radio experience may remain the same despite an LTE/Wi-Fi radio bit rate being 64 kbit/s or 300 Mbit/s. In this case using both LTE and Wi-Fi for 64 kbit/s Internet radio would not benefit data traffic but instead may simply waste UE resources e.g., battery power. On the other hand downloading/uploading large files, like videos, can benefit from a usage of both LTE and Wi-Fi radio carriers. Thus, it can be seen that classifying the type traffic is important to determining whether to perform a carrier aggregation and thus utilize available radio resources most efficiently. However, this is presently not the case and so the exemplary embodiments provide at least a method to address at least this shortfall.

For example, a Samsung Galaxy S5® (SGS5) download booster feature determines to use both LTE and Wi-Fi for downloading single file in case file size exceeds 30 MB. This UE feature is utilizing HTTP ranges when initiating file download. Still, a network operator has no influence how SGS5 utilizes different networks.

The exemplary embodiments of the invention relate to mechanisms for controlling activation of LTE/Wi-Fi aggregation function when beneficial and deactivating the function at other times. The invention classifies user data into a) traffic not benefiting from simultaneous LTE & Wi-Fi use and b) traffic benefiting from simultaneous LTE & Wi-Fi use and c) traffic benefiting from duplication over LTE and Wi-Fi and d) traffic benefiting from simultaneous LTE licensed, LTE unlicensed and Wi-Fi use and e) simultaneous LTE licensed and LTE unlicensed and macro—small cells use. The exemplary embodiments of the invention provide mechanisms for determining activation and deactivation of the aggregation function and monitoring during aggregation what to do next. This supports network operator friendly mechanism for LTE RAN to determine optimum use of LTE and Wi-Fi radios. While Wi-Fi is used as SCell example in the document, the invention can be utilized for example as part of Dual Connectivity (macro eNB is PCell and LTE pico eNB is SCell) to determine when to use both macro and small cells to deliver data to a UE.

Figure 2:
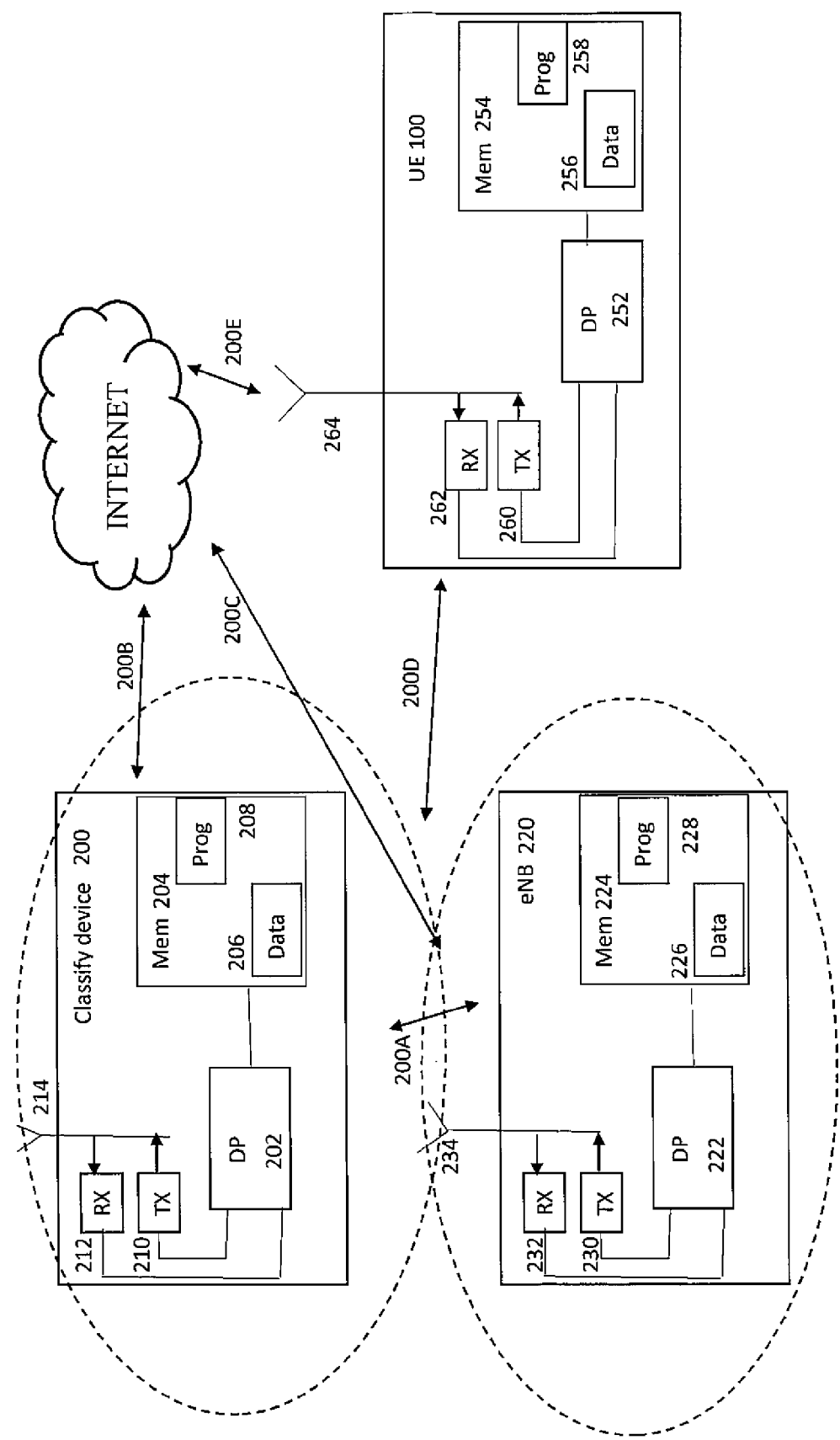
FIG. 2 shows a simplified block diagram of devices configured to perform operations in accordance with the exemplary embodiments of the invention.

Before describing the exemplary embodiments of the invention in further detail reference is now made to FIG. 2. FIG. 2 illustrates a simplified block diagram of devices such as a Classify device 200 and an eNB 220, and a user device, such as a UE 100, suitable for use in practicing the exemplary embodiments of this invention. In FIG. 2 apparatuses, such as the Classify device 200 and the eNB 220, are adapted for communication with other apparatuses having wireless communication capability, such as each other and the UE 100.

The Classify device 200 includes processing means such as at least one data processor (DP) 202, storing means such as at least one computer-readable memory (MEM) 204 storing data 206 and at least one computer program (PROG) 208 or other set of executable instructions, communicating means such as a transmitter TX 210 and a receiver RX 212 for bidirectional wireless communications with the UE 250 via an antenna 214.

It is noted that in FIG. 2 there are dashed lines around the Classify device 200 and the eNB 220. These dashed lines may indicate cells. The cells may be different cells or the same cell, such as the may be both part of a same cell A for example, or they may be different cells such as a cell A and a cell B for example. In addition, Classify device 200 may be incorporated into a network device such as an eNB. The Classify device 200 can be separate from the cell(s) and located elsewhere such as in a wireless network or another network. Further, the Classify device may be a server such as an application server.

The eNB 220 includes processing means such as at least one data processor (DP) 222, storing means such as at least one computer-readable memory (MEM) 224 storing data 226 and at least one computer program (FROG) 228 or other set of executable instructions, communicating means such as a transmitter TX 230 and a receiver RX 232 for bidirectional wireless communications with the UE 100 via an antenna 234.

The UE 100 includes processing means such as at least one data processor (DP) 252, storing means such as at least one computer-readable memory (MEM) 254 storing data 256 and at least one computer program (PROG) 258 or other set of executable instructions, communicating means such as a transmitter TX 260 and a receiver RX 262 for bidirectional wireless communications with the Classify device 200 or the eNB 220 via one or more antennas 264. UE capable of dual connectivity may have multiple transmitters TX and receivers RX to enable simultaneous communication with Classify device 200 and eNB 220. In addition, it is noted that although FIG. 2 may only illustrate one transmitter TX and one receiver RX in the Classify device 200, the eNB 220, or the UE 100 this is non-limiting in accordance with the exemplary embodiments and these devices can each be configured to simultaneously support multiple RX and/or TX communications or chains with multiple devices. In accordance with the exemplary embodiments the data 206, 226, and/or 256 may include data required to implement a method and operate an apparatus in accordance with the exemplary embodiments of the invention.

At least one of the PROGs 208 in the Classify device 200 is assumed to include a set of program instructions that, when executed by the associated DP 202, enable the device to operate in accordance with the exemplary embodiments of this invention, as detailed above. In these regards the exemplary embodiments of this invention may be implemented at least in part by computer software stored on the MEM 204, which is executable by the DP 202 of the Classify device 200, or by hardware, or by a combination of tangibly stored software and hardware (and tangibly stored firmware).

Similarly, at least one of the PROGs 228 in the eNB 220 is assumed to include a set of program instructions that, when executed by the associated DP 222, enable the device to operate in accordance with the exemplary embodiments of this invention, as detailed above. In these regards the exemplary embodiments of this invention may be implemented at least in part by computer software stored on the MEM 224, which is executable by the DP 222 of the eNB 220, or by hardware, or by a combination of tangibly stored software and hardware (and tangibly stored firmware).

Similarly, at least one of the PROGs 258 in the UE 100 is assumed to include a set of program instructions that, when executed by the associated DP 252, enable the device to operate in accordance with the exemplary embodiments of this invention, as detailed herein. In these regards the exemplary embodiments of this invention may be implemented at least in part by computer software stored on the MEM 254, which is executable by the DP 252 of the UE 100, or by hardware, or by a combination of tangibly stored software and hardware (and tangibly stored firmware). Electronic devices implementing these aspects of the invention need not be the entire devices as depicted at FIG. 2 or may be one or more components of same such as the above described tangibly stored software, hardware, firmware and DP, or a system on a chip SOC or an application specific integrated circuit ASIC.

As shown in FIG. 2 communication between the Classify device 200 and the eNB 220 can be made via one or more links 200A. Further, communication between the Classify device 200 and the eNB 220 can be using another network such as the Internet as shown with links 200B and 200C. In addition, the UE 100 may communicate with the eNB 220 and/or the Classify device 200 using at least one of communication paths link 200D, 200E, 200C, 200B, and/or 200A. Further, any of these links can be wired and/or wireless links, and any of these links can be backhaul type links. Further, the communication path link 200E can represent at least in part a Wi-Fi link. The link 200E and/or 200C may include a wireless access point which may facilitate such a Wi-Fi link in accordance with the exemplary embodiments of the invention. The Wi-Fi link may be based on IEEE 802.11 standards. Such standards including media access control (MAC) and physical layer (PHY) specifications for implementing wireless local area network (WLAN) computer communication in at least 2.4, 3.6, 5, and 60 GHz frequency bands.

In general, the various embodiments of the UE 100 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEM 204, 224, and 254 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 202, 222, and 252 include but are not limited to general purpose computers, special purpose computers, microprocessors, digital signal processors (DSPs) and multi-core processors.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

As described below there are example cases where LTE/Wi-Fi aggregation may be used to selectively to find optimal balance between one or more of user experience, quality of service (QoS), network resource utilization and UE battery consumption.

Traffic Classification:

Traffic classification may simply determine if traffic benefits from aggregation. In simplest form this can be 1 bit field, e.g. 0=no aggregation and 1=aggregation. Traffic classification function can be in RAN or EPC, it can be e.g. SW enhancement on top of existing DPI (Deep Packet Inspection) function or it can be heurestics in RAN or EPC element (for example eNB, PDN-GW or Serving GW monitoring traffic and noticing e.g. small packets with certain frequency allowing to conclude low bit rate voice or Internet radio service). Traffic classification function can be located also in an application/application server (outside of wireless networks) in which case wireless network, like LTE, reads information from IP/TCP/UDP/other header the application uses to communicate to determine applicability of aggregation. As an option, if traffic classification is located outside of wireless networks, PCRF or similar functionality in the mobile network can be contacted to set correct characteristics for the traffic type throughout the network (PCRF configures e.g. PDN-GW which sets appropriate fields in GTP etc. messages to identify traffic type and aggregation relationship).

EPC Based Classification:

In case traffic classification function is in EPC, it needs to transfer classification information to RAN via user data packets and/or signaling messages. For example where DSCP marking is used for QoS/prioritization purposes, 1 DSCP field bit is reserved for aggregation marking or certain DSCP value or value range denotes for aggregation functionality. For example last DSCP field bit denotes if aggregation function benefits the traffic or not. Or DSCP value 30-45 denotes traffic benefiting from aggregation and the number denotes priority of the traffic. Also GTP messages can be used by EPC to notify RAN about traffic classification information.

FIG. 3A describes an example GTP extension header included into user data packet when EPC wants to denote traffic classification for aggregation function into RAN. A new extension header is defined as an example in FIG. 3A that includes Traffic Classification (TC) bit and spare bits that can be used later on to extend Traffic Classification information or for other purposes. The extension header can be included into all GTP-U messages sent from EPC to RAN (e.g. eNB) or only when for example traffic benefiting from aggregation function is transferred to RAN. As shown in FIG. 3A the TC bit can be placed in the 8$^{th}$ Octet/Bit field of the extension header. It is noted that this is non-limiting and the TC bit may be placed in any Octet/Bit field and/or in a different type of header.

FIG. 3B shows an example TC field values. As shown in FIG. 3B a TC field value of 0 may indicate that data traffic to and/or from the UE 100 of FIG. 2 for example, would not benefit from carrier aggregation. Where as shown in FIG. 3B a value of 1 in the TC field of the header may indicate that the data traffic would benefit from carrier aggregation. It is noted that these values are non-limiting and opposite indications by these values may be the case.

Other methods in accordance with the exemplary embodiments of the invention that can be used to mark the user traffic according to the classification can include for example the following means:

- Using the user IP header DSCP-field. This six-bit field is defined by RFC 2474 for Differentiated services (Diff-Serv), and is used both in IPv4 and IPv6 headers. As there are 64 different possible
- DSCP-codes, we consider it feasible to spare one or even two bits of the DSCP-field for the purpose of ours.
  - DSCP marking can be used also by application and application server.
  - Using the HTTP-header enrichment. The classifier can insert information about the LTE/wifi aggregation recommendation to the HTTP-header of the user traffic.

HTTP-header fields can be transmitted after a request or response line, which may be the first line of a message. Header fields are colon-separated name-value pairs in cleartext string format, terminated by a carriage return (CR) and line feed (LF) character sequence. The end of the header section may be indicated by an empty field, resulting in the transmission of two or more consecutive CR-LF pairs.

Besides identifying if a traffic benefits from aggregation or not, it can be also identified how reliable traffic delivery needs to be or in general how much data is transmitted over one radio, over second radio and optionally over an Nth radio (portion of traffic over used radios, like 70:30 means 70% over LTE and 30% over Wi-Fi, this may be guidance/ preference which is executed e.g. by RAN as seen feasible). For example LTE provides reliable message transfer over the radio if needed (RLC ACK mode). Wi-Fi on the other hand retransmits lost radio blocks for a number of times after which Wi-Fi simply discards the data and then it's up to higher layers to recover from the situation. Thus where aggregation is enabled for example for a single data stream (e.g. packets belonging to one application), the usage of Wi-Fi (or LTE) can be defined. For example if the preference is to use more LTE and less Wi-Fi, the likelihood of getting more packets through during bad radio conditions is increased. For example in video streaming if few packets are lost the codecs may be able to play the video without user noticing anything where losing too many packets affects negatively on user experience.

Caching Based Classification:

If user content caching is used, the classification marking can be stored to the cache along with the cached object. This provides at least the following benefits:

- The cached content needs to be analyzed only once, and thus the analytics related system resources can be saved.
- For the content stored in cache it is easier to define the LTE WiFi aggregation policy in an anticipatory manner per cached object, as the first-time analysis of the data object of the user may be able to classify the object correctly only after it has been already at least partially consumed by the user.

RAN Based Classification:

In case traffic classification function is in RAN, e.g. as part of application awareness, RAN can handle using internal messaging the marking if the user data packet benefits from aggregation function. RAN can determine traffic type using heuristics (e.g. destination/source IP address, port, size and frequency of packets etc.), QoS information etc. available information.

Classification Examples:

Traffic classification may categorize traffic based on for example:

- Application type as identified by e.g. DPI type of function (classification doesn't have to be in DPI) such as:
  - Internet radio has constant bit rate and as such may not benefit from aggregation;
  - Browsing benefits from faster responses and benefits from aggregation;
  - Email sync to server benefits from faster responses and benefits from aggregation; and/or
  - Facebook traffic is typically small updates and may not benefit from aggregation by default. In case videos start to be transmitted, then traffic classification may start marking the traffic as benefiting from aggregation.
- Content Stored on Caching Server
  - As an example, Liquid Apps server cache may store content to be made quickly and efficiently available to users. Thus, the server knows information such as content type and content size.
    - If large file is transmitted to UE, traffic may be marked as benefiting from aggregation.
- As user data uses increasingly secured connections (like HTTPs), application types may become unavailable also to DPI. In such a case for example:
  - Client and/or server may start using IP header fields, like server name, to allow identification of traffic;
  - Traffic classification function may monitor traffic type to determine value of aggregation. Bursty traffic type or high bit rate for longer period of time denotes aggregation benefits whereas smaller constant bit rate denotes no real value from aggregation;

Source/destination IP address or TCP/UDP port number may denote traffic type and if traffic benefits from aggregation function or not.

Max bitrate used;

There is similarity to a large file download; and

IP header information, e.g., ToS field.

Traffic Monitoring

For example, by detecting a data stream that has lasted over some time period means likely there's more data to be transmitted, thus aggregation may be activated assuming the traffic is bursty and not using fixed bit rate; and/or Traffic using a large fixed bit rate may also benefit from aggregation as aggregation ensures temporary hiccup on one radio doesn't lead to bad user experience.

The classification can be for example:

Bearer based: all traffic in certain bearers, characterized by the QCI class, can be classified according how much it is expected to benefit from the LTE WiFi aggregation; and/or Packet based: all user IP data packets can be individually classified according to how much they are expected to benefit from the aggregation.

The classification rules can either be:

Defined according to operator specific semi-static rules, e.g., all low bandwidth applications with max throughput below certain threshold can be directed to LTE only. The rules can be configured per application using the 3GPP policy control framework (PCC) with deep packet inspection (DPI) (add ref.); and/or Based on automated learning. The system is trained to detect and classify traffic according to how much it is expected to benefit from the aggregation. The success criteria for learning needs to be defined according to:

User QoE preferences, e.g. download speed, battery consumption

Operator preferences, such as preference settings for any of the rules or conditions defined herein. For example, thresholds can be set for devices such as Classify device 200, eNB 220, and/or UE 100 of FIG. 2. The thresholds can be set using operator specified values for any monitored types of data and thus used to trigger and/or determine classification settings and self-learning features.

For the automated learning there are alternatives:

The classification system is trained to define rules according to the measured gain/loss in using different policy alternatives for example:

Different applications, e.g., certain video conference application detected by DPI;

Certain content used by certain application, e.g., applications known or detected as needing to use large files and/or require more data throughput; and/or A classification system that is able to measure the success of the classification policy online against the criteria, in this case the algorithm can be self-adjusting. At least regarding measuring success of the classification policy:

A first alternative of the learning based solution provides a classification capability based on the optimization of the measured QoE of the users weighted by the policies of operator which can be defined per application, user etc. This kind of classification solution can be implemented in principle in any place of the traffic user plane. The benefit is that the solution can be implemented independent of the network elements and is easier to introduce to the network independent of what is supported by the different network.

A second alternative of the learning based solution can also utilize measurement information related to the conditions of the access system to which the traffic is allocated. This can mean for instance information related to the available throughput capacity for the individual users in the access system (e.g., WiFi, LTE), radio signal strength, and the mobility of the users, just to mention some examples. The system can in this case be trained to optimize the aggregation performance in different conditions of the access. In this case traffic classification can be used to communicate the type of traffic (e.g. application type, operator defined priority) to the entity responsible for the aggregation, which can optimize the aggregation on packet level based on its training. The information about the access conditions can be provided to the aggregation entity e.g. through the internal interfaces of the network element like a base station containing such information, or the information can be provided in the uplink direction for instance as embedded to the user or control plane traffic if the aggregation entity is located further uplink in the user plane, for instance in the core network.

In addition, UE can help the network to classify traffic. For example in HSUPA (High Speed Uplink Packet Access) a UE uses Happy Bit to denote to the network if the UE is satisfied with allocated uplink resources or if the UE has enough data in uplink transmit buffer to use more uplink resources. Therefore Happy Bit type of approach could be used for uplink aggregation, UE can use uplink transmit buffer status, ongoing applications in the UE (e.g. UE operating system may have application identifiers to use) etc. information to tell the network if uplink (and/or downlink) aggregation should be enabled/disabled. The notification can be done e.g. as a new field in existing RRC message communicated from the UE to eNB, for example "Aggregation-Requested" bit. It's then up to the network to further evaluate, using UE input as one/the factor in decision making, if aggregation is enabled/disabled. Likewise, if an application running on a UE, like video, is detected to run out of data a UE may indicate to network using "DL Aggregation-Requested" if more downlink speed, thus aggregation, is desired. UE may evaluate e.g. availability of Wi-Fi AP (or eNB pico for Dual Connectivity), current speeds, bit/error rate, HTTP(s) file size to be downloaded etc. before indicating to network if uplink and/or downlink aggregation is desired.

Traffic classification produces an outcome that radio resource management function in eNB, RNC, NB, WLAN Controller, Wi-Fi AP, Serving GW etc. Network elements and their logic may use to determine usefulness of aggregation function when delivering user data packets (downlink and uplink).

Traffic Benefiting from Simultaneous Transmission of User Data Over Multiple Radios There are selected cases where it's beneficial to transmit the same traffic (=duplicate) over multiple radios where network has available capacity (e.g. outside busy hour). Example situations include:

When RAN has initiated handover or RAT reselection using e.g. 3G/LTE and Wi-Fi ensures the UE has one operational radio available at all times. Thus, for example aggregation can be activated (if inactive):

upon deciding of mobility and e.g. deactivated after executing mobility and optionally when noticing stabilized connection on the new cell/RAT/network; and/or When user has e.g. voice or video call and used primary radio has challenges (load, RF quality), same data can be duplicated over Wi-Fi.

Activation of Aggregation Function

When radio resource manager (RRM)/scheduler, here commonly addressed as RRM, receives information indicating that aggregation benefits the traffic, the RRM enables the aggregation function in case the UE has both LTE and Wi-Fi accesses available. In an alternative, if Serving GW distributes traffic across LTE and Wi-Fi then Serving GW "Aggregation Coordinator" function enables aggregation. This means that Serving GW sends selected traffic to LTE radio (eNB) and other traffic to Wi-Fi radio (Wi-Fi AP). In this document RRM is used as a common nominator for functionality activating, deactivating and optionally monitoring aggregation.

The RRM initiates radio resource management procedure in order to establish a new radio connection, in case UE uses LTE then RRM initiates establishment of Wi-Fi radio resources. During connection establishment the RRM may tell the UE if aggregation is applied only into downlink or uplink direction or into both directions. For example browser traffic benefits typically high downlink speeds whereas synchronizing a picture album to cloud server benefits from high speed uplink. For the treatment of the uplink traffic it is also possible to consider the following feature: For each packet received in downlink direction, the UE can decide per packet flow how aggregation is performed in the uplink direction. Packet flow means the set of downlink and uplink IP packets having the same IP 5-tuple data in their IP header. The IP header 5-tuple consists of the following data: source IP address/port number, destination IP address/port number and the protocol in use. One useful application of this that the UE uses the aggregation in uplink the same way for the flow as what was used in the downlink direction. There is a practical benefit in this method since one single radio connection (radio bearer) can contain different type of flows, benefiting from different treatment.

Monitoring Aggregation Function Usefulness

When aggregation is utilized, RRM monitors use of active radios. Signal strength, network load, delay (e.g. queue lengths), transmit buffer status etc. may be monitored to determine how useful the aggregation function is and how well each active radio performs.

Deactivating Aggregation Function

Aggregation function deactivates by default when data transmission ends or UE loses the coverage of used network. Once aggregation function has been activated, RRM may deactivate the aggregation function also in the middle of transmission. Trigger to deactivate aggregation in the middle of data transmission may come for example from:

Detecting that one of the used radios is not performing well enough. For example UE has poor Wi-Fi signal strength and/or radio transmission has many errors or only low bit rate channel codec may be used.

Detecting that used application benefits no longer from higher bit rates. For example after starting video playback constant bit rate mode is entered where aggregation might no longer provide benefits but it just drains UE battery.

In case during video playback there's a bursty data period it can mean UE data buffer is running out thus aggregation may be activated once again to ensure video playback buffer is filled as soon as possible.

Figure 4:
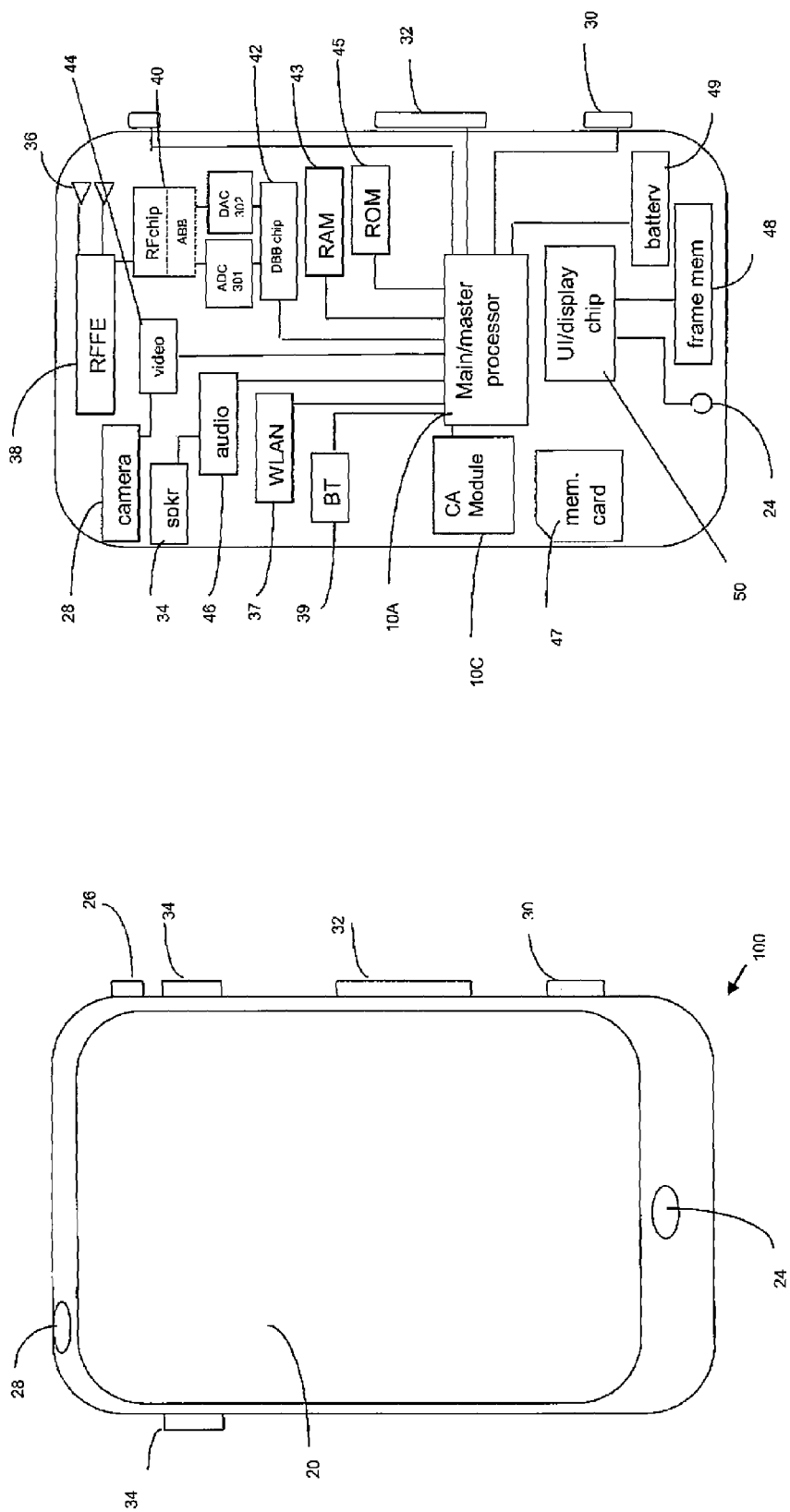
FIG. 4 shows a schematic diagram in plain view (left) and sectional view (right) of a mobile handset capable of performing operations according to an exemplary embodiment of the invention.

FIG. 4 shows a schematic diagram in plain view (left) and sectional view (right) of a mobile handset capable of performing operations according to an exemplary embodiment of the invention. The mobile handset may be a UE 100 as shown in FIG. 2. The UE 100 in both plan view (left) and sectional view (right) which may be configured to perform the operations in accordance with the exemplary embodiments. As shown in FIG. 3, the UE 100 includes a graphical display interface (e.g., touchscreen) 20 and a user interface that comprises a microphone 24 and speaker(s) 34 and touch-screen technology at the graphical display interface 20 and/or voice-recognition technology for audio signals received at the microphone 24. A power actuator 26 controls the UE 100 being turned on and/or off by the user. The UE 100 may include a camera(s) module 28, which is shown as forward facing (e.g., for video calls) but may alternatively or additionally be rearward facing (e.g., for capturing images and video for local storage). The camera(s) 28 may be controlled by a shutter actuator 30 and optionally by a zoom actuator 32, which may alternatively function as a volume adjustment for the speaker(s) 34 when the camera 28 is not in an active mode. Signals to and from the camera(s) 28 pass through an image/video processor (video) 44, which encodes and decodes the image data (e.g., image frames). A separate audio processor 46 may also be present to control signals to and from the speakers (spkr) 34 and the microphone 24. The graphical display interface 20 is refreshed from a frame memory (frame mem) 48 as controlled by a user GPU 50, which may process signals to and from the display interface 20. These actuators may also be implemented using touch-screen technology.

Also within the sectional view of FIG. 4 are seen multiple transmit/receive antennas 36 that are typically used for wireless communication (e.g., cellular communication). The antennas 36 may be multi-band for use with other radios in the UE. The operable ground plane for the antennas 36 may span the entire space enclosed by the UE housing, though in some embodiments the ground plane may be limited to a smaller area, such as disposed on a printed wiring board on which a RF front-end (RFFE) 38 is formed. The RFFE 38 controls power amplification on the channels being transmitted on and/or across the antennas that transmit simultaneously, where spatial diversity is used. The RFFE 38 outputs to the radio frequency (RF) chip 40, which amplifies, demodulates and down converts the signal for analog baseband (ABB) processing. The analog to digital converter (ADC) 301 converted analog signal to bit-stream, which the digital baseband (DBB) chip 42 detects and finally decoded. Similar processing occurs in reverse for signals generated in the UE 100 and transmitted from the UE.

In addition, the UE 100 may perform carrier aggregation communication, including activating and deactivating carrier aggregation operations as described herein. The activating and deactivating of the carrier aggregation may be applied to received and/or transmitted data. Functions associated carrier aggregation including, but not limited to, the performing, the activating, and/or the deactivating of carrier aggregation operations may be enabled by circuitry such as in the CA module 10C of FIG. 4.

The DBB and/or RFIC may also include any of a processor and a memory including computer program code, which controlling transceivers parameters to optimize performance of it. Program code could be storage to memory and it may include algorithms and/or lookup tables (LUT). In addition, it is noted that the placement of any of these components are not limiting and any of the components shown in FIG. 4 may be placed differently and still operate in accordance with the exemplary embodiments. As an example, the ADC and DAC could be on the RFIC side or in the BB side or they even could be separate from both. It is noted that any of the configuration shown in FIG. 4 is not limiting to operations performed in accordance with the exemplary embodiments of the invention.

Certain exemplary embodiments of the UE 100 may also include one or more secondary radios such as a wireless local area network radio (WLAN) 37 and/or a Bluetooth radio (BT) 39, which may incorporate one or more on-chip antennas or be coupled to one or more off-chip antennas. Throughout the UE 100 are various memories 125, such as a random access memory (RAM) 43, a read only memory (ROM) 45, and, in some exemplary embodiments, a removable memory such as the illustrated memory card 47. In some exemplary embodiments, various programs (such as computer program code 315) are stored on the memory card 47. The components within the UE 100 may be powered by a portable power supply such as a battery 49.

It is noted that the communications and/or operations as described in FIGS. 1, 2, 3A, 3B, and/or 4 are non-limiting to the exemplary embodiments of the invention. The devices and the related operations are merely illustrative of devices and operations for use in practicing the exemplary embodiments of this invention. Further, any of these operations can be performed using any suitable device including a mobile user equipment as shown in FIG. 4. Further, the operations as described below may be performed in a different order and/or by different devices than what is described. The exemplary embodiments of the invention may be used in any device which includes an ADC. Such device can include, but are not limited to, smartphones, tablets, and PDAs. Further, the exemplary embodiments of the invention may be practiced in any device such as a device with an LTE interface.

FIG. 5A illustrates operations which may be performed by a network device such as, but not limited to, a classify device (e.g., the Classify device 200 as in FIG. 2) and/or a network device (e.g., the eNB 220 as in FIG. 2). As shown in step 510 of FIG. 5A, there is determining, by a device, a level of benefit to at least one of a user equipment and a network to aggregate data traffic to or from the user equipment over more than one carrier. At step 520 there is, based on the determining, indicating a traffic classification of the data traffic to or from the user equipment, wherein the traffic classification identifies the level of the benefit to aggregate the data traffic to or from the user equipment over the more than one carrier.

In accordance with the exemplary embodiments as described in the paragraph above, the more than one carrier comprises a long term evolution carrier and a wi-fi carrier.

In accordance with the exemplary embodiments as described in the paragraphs above, the determining the level of benefit is taking into account at least one of types of the data traffic, and at least one application at the user equipment that is using the data traffic.

In accordance with the exemplary embodiments as described in the paragraphs above, the level of benefit is determined for the at least one application based on a usage by an application of a particular type of the types of the data traffic.

In accordance with the exemplary embodiments as described in the paragraphs above, the level of benefit takes into account at least one of a handover and a radio access technology reselection operation being performed by the user equipment, and that the aggregating is repeating the data traffic over each of the long term evolution carrier to the wi-fi carrier.

In accordance with the exemplary embodiments as described in the paragraphs above, the determining the level of benefit is using operator specified rules, and wherein the operator specified rules use thresholds associated with at least one of the at least one application and the types of the data traffic being aggregated.

In accordance with the exemplary embodiments as described in the paragraphs above, there is indicating with the traffic classification to another device to one of activate and deactivate aggregating of the data traffic to or from the user equipment over the long term evolution carrier and the wi-fi carrier.

In accordance with the exemplary embodiments as described in the paragraphs above, the traffic classification is indicated in at least one of a field of an extension header of the data traffic, a signaling message, and a hypertext transport protocol header associated with the data traffic.

In accordance with the exemplary embodiments as described in the paragraphs above, the determining is using automated learning rules, and wherein the automated learning rules are self-adjusting based on at least a measured gain/loss of prior use of indications of traffic classification for activating and deactivating aggregating of the data traffic to the user equipment.

In accordance with an exemplary embodiment of the invention as described above there is an apparatus comprising: means for determining, by a device [Classify device 200 and/or eNB 220], a level of benefit to at least one of a user equipment [UE100] and a network [Cell A and/or Cell A and B] to aggregate data traffic to or from the user equipment over more than one carrier. Further, there is means, based on the determining, for indicating [Classify device 200 and/or eNB 220] a traffic classification of the data traffic to or from the user equipment [UE100], wherein the traffic classification identifies the level of the benefit to aggregate the data traffic to or from the user equipment over the more than one carrier.

In the exemplary aspect of the invention according to the paragraph above, wherein the means for determining and indicating comprises a non-transitory computer readable medium [MEM 204, 224, and/or 254] encoded with a computer program [PROG 208, 228, and/or 258]; and/or [Data 206, 226, and 256] executable by at least one processor [DP 202, 222, and/or 252].

FIG. 5B illustrates operations which may be performed by a device such as, but not limited to, a device (e.g., the UE100 and/or the eNB 220 as in FIG. 2). As shown in step 550 of FIG. 5*b*, there is identifying, by a network device, a traffic classification of data traffic to or from a user equipment. At step 560 there is, based on the identified traffic classification, one of activating and deactivating an aggregation over more than one carrier of the data traffic to or from the user equipment, wherein the traffic classification identifies a level of benefit to at least one of the user equipment and a network to aggregate the data traffic to or from the user equipment over more than one carrier.

In accordance with the exemplary embodiments as described in the paragraph above, the more than one carrier comprises a long term evolution carrier and a wi-fi carrier.

In accordance with the exemplary embodiments as described in the paragraphs above, the level of benefit is taking into account at least one of types of the data traffic, and at least one application at the user equipment that is using the data traffic.

In accordance with the exemplary embodiments as described in the paragraphs above, the level of benefit takes into account at least one of a handover and a radio access technology reselection operation being performed by the user equipment, and that the aggregating is repeating the data traffic over each of the long term evolution carrier and the wi-fi carrier.

In accordance with the exemplary embodiments as described in the paragraphs above, the traffic classification is indicated in at least one of a field of an extension header of the data traffic, a signaling message, and a hypertext transport protocol header associated with the data traffic.

In accordance with an exemplary embodiment of the invention as described above there is an apparatus comprising: means for identifying, by a network device [UE 100 and/or eNB 220], a traffic classification of data traffic to or from a user equipment [UE100]. Further, there is means, based on the identified traffic classification, for one of activating and deactivating [UE 100 and/or eNB 220] an aggregation over more than one carrier of the data traffic to or from the user equipment [UE100], wherein the traffic classification identifies a level of benefit to at least one of the user equipment [UE 100] and a network [Cell A and/or Cell A and B] to aggregate the data traffic to or from the user equipment over more than one carrier In the exemplary aspect of the invention according to the paragraph above, wherein the means for identifying, activating, and deactivating comprises a non-transitory computer readable medium [MEM 204, 224, and/or 254] encoded with a computer program [FROG 208, 228, and/or 258]; and/or [Data 206, 226, and 256] executable by at least one processor [DP 202, 222, and/or 252].

The apparatus may be, include or be associated with at least one software application, module, unit or entity configured as arithmetic operation, or as a computer program or portions thereof (including an added or updated software routine), executed by at least one operation processor, unit or module. Computer programs, also called pro gram products or simply programs, including software routines, applets and/or macros, may be stored in any apparatus-readable data storage medium. A computer program product may comprise one or more computer-executable components which, when the program is run, are configured to carry out embodiments described above by means of FIGS. 5A and/or 5B. Additionally, software routines may be downloaded into the apparatus.

The apparatus, such as a node or user device, or a corresponding component, may be configured as a computer or a microprocessor, such as single-chip computer element, or as a chipset, including or being coupled to a memory for providing storage capacity used for software or arithmetic operation(s) and at least one operation processor for executing the software or arithmetic operation(s).

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:
   at least one processor; and
   at least one memory including computer program code, where the at least one memory and the computer program code are configured, with the at least one processor, to cause the apparatus to at least:
   determine a level of benefit to at least one of a user equipment and a network to aggregate data traffic to or from the user equipment over more than one carrier; and
   based on the determining, indicate in a field of at least one of an extension header and a hypertext transport protocol header of the data traffic a traffic classification of the data traffic to or from the user equipment, wherein the traffic classification identifies the level of the benefit to aggregate the data traffic to or from the user equipment over the more than one carrier.

2. The apparatus of claim 1, wherein the more than one carrier comprises a long term evolution carrier and a wi-fi carrier, wherein the determining the level of benefit is taking into account at least one of types of the data traffic, and at least one application at the user equipment that is using the data traffic.

3. The apparatus of claim 2, wherein the level of benefit is determined for the at least one application based on a usage by an application of a particular type of the types of the data traffic.

4. The apparatus of claim 2, wherein the level of benefit takes into account at least one of a handover and a radio access technology reselection operation being performed by the user equipment, and that the aggregating is repeating the data traffic over each of the long term evolution carrier to the wi-fi carrier.

5. The apparatus of claim 2, wherein the determining the level of benefit is using operator specified rules, and wherein the operator specified rules use thresholds associated with at least one of the at least one application and the types of the data traffic being aggregated.

6. The apparatus of claim 2, wherein the at least one memory including the computer program code is configured with the at least one processor to cause the apparatus, to indicate with the traffic classification to another device, to one of activate and deactivate aggregating of data traffic to or from the user equipment over the long term evolution carrier and the wi-fi carrier.

7. The apparatus of claim 1, wherein the field is a one bit field, and wherein a zero indicated in the one bit field identifies no benefit to the aggregation and a one indicated in the one bit field identifies a benefit to the aggregation.

8. The apparatus of claim 1, wherein the determining is using automated learning rules, and wherein the automated learning rules are self-adjusting based on at least a measured gain/loss of prior use of indications of traffic classification for activating and deactivating aggregating of the data traffic to the user equipment.

9. A method comprising:
  determining, by a device, a level of benefit to at least one of a user equipment and a network to aggregate data traffic to or from the user equipment over more than one carrier; and
  based on the determining, indicating in a field of at least one of an extension header and a hypertext transport protocol header of the data traffic a traffic classification of the data traffic to or from the user equipment, wherein the traffic classification identifies the level of the benefit to aggregate the data traffic to or from the user equipment over the more than one carrier.

10. The method of claim 9, wherein the more than one carrier comprises a long term evolution carrier and a wi-fi carrier, and wherein the determining the level of benefit is taking into account at least one of types of the data traffic, and at least one application at the user equipment that is using the data traffic.

11. The method of claim 10, wherein the level of benefit is determined for the at least one application based on a usage by an application of a particular type of the types of the data traffic.

12. The method of claim 10, wherein the level of benefit takes into account at least one of a handover and a radio access technology reselection operation being performed by the user equipment, and that the aggregating is repeating the data traffic over each of the long term evolution carrier to the wi-fi carrier.

13. The method of claim 10, wherein the determining the level of benefit is using operator specified rules, and wherein the operator specified rules use thresholds associated with at least one of the at least one application and the types of the data traffic being aggregated.

14. The method of claim 10, comprising indicating with the traffic classification to another device to one of activate and deactivate aggregating of the data traffic to or from the user equipment over the long term evolution carrier and the wi-fi carrier.

15. The method of claim 9, wherein the field is a one bit field, and wherein a zero identified in the one bit field indicates no benefit to the aggregation and a one identified in the one bit field indicates a benefit to the aggregation.

16. The method of claim 9, wherein the determining is using automated learning rules, and wherein the automated learning rules are self-adjusting based on at least a measured gain/loss of prior use of indications of traffic classification for activating and deactivating aggregating of the data traffic to the user equipment.

17. An apparatus comprising:
  at least one processor; and
  at least one memory including computer program code, where the at least one memory and the computer program code are configured, with the at least one processor, to cause the apparatus to at least:
  identify in a field of at least one of an extension header and a hypertext transport protocol header of data traffic a traffic classification of the data traffic to or from a user equipment; and
  based on the identified traffic classification, one of activate and deactivate an aggregation over more than one carrier of the data traffic to or from the user equipment, wherein the traffic classification identifies a level of benefit to at least one of the user equipment and a network to aggregate the data traffic to or from the user equipment over more than one carrier.

18. The apparatus of claim 17, wherein the more than one carrier comprises a long term evolution carrier and a wi-fi carrier, and wherein the level of benefit is taking into account at least one of types of the data traffic, and at least one application at the user equipment that is using the data traffic.

19. The apparatus of claim 18, wherein the level of benefit takes into account at least one of a handover and a radio access technology reselection operation being performed by the user equipment, and that the aggregating is repeating the data traffic over each of the long term evolution carrier and the wi-fi carrier.

20. The apparatus of claim 17, wherein the field is a one bit field, and wherein a zero identified in the one bit field indicates no benefit to the aggregation and a one identified in the one bit field indicates a benefit to the aggregation.

21. A method comprising:
  identifying, by a network device, in a field of at least one of an extension header and a hypertext protocol header of data traffic a traffic classification of the data traffic to or from a user equipment; and
  based on the identified traffic classification, one of activating and deactivating an aggregation over more than one carrier of the data traffic to or from the user equipment, wherein the traffic classification identifies a level of benefit to at least one of the user equipment and a network to aggregate the data traffic to or from the user equipment over more than one carrier.

22. The method of claim 21, wherein the more than one carrier comprises a long term evolution carrier and a wi-fi carrier, and wherein the level of benefit is taking into account at least one of types of the data traffic, and at least one application at the user equipment that is using the data traffic.

23. The method of claim 22, wherein the level of benefit takes into account at least one of a handover and a radio access technology reselection operation being performed by the user equipment, and that the aggregating is repeating the data traffic over each of the long term evolution carrier and the wi-fi carrier.

24. The method of claim 21, wherein the field a one bit field, and wherein a zero identified in the one bit field indicates no benefit to the aggregation and a one identified in the one bit field indicates a benefit to the aggregation.

* * * * *